(12) United States Patent
Fujita et al.

(10) Patent No.: US 7,245,788 B2
(45) Date of Patent: Jul. 17, 2007

(54) OPTICAL MODULATOR

(75) Inventors: Takahisa Fujita, Tokyo (JP); Satoshi Oikawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/233,661

(22) Filed: Sep. 23, 2005

(65) Prior Publication Data

US 2006/0165337 A1    Jul. 27, 2006

(30) Foreign Application Priority Data

Sep. 30, 2004  (JP) ............................. 2004-288916
Nov. 18, 2004  (JP) ............................. 2004-333880

(51) Int. Cl.
*G02F 1/035* (2006.01)

(52) U.S. Cl. .......................................... 385/3
(58) Field of Classification Search ..................... 385/3
See application file for complete search history.

(56) References Cited

U.S. PATENT DOCUMENTS

| | | | | |
|---|---|---|---|---|
| 5,005,932 A * | 4/1991 | Schaffner et al. ............... | 385/3 |
| 5,278,923 A * | 1/1994 | Nazarathy et al. .............. | 385/3 |
| 5,291,565 A * | 3/1994 | Schaffner et al. ............... | 385/3 |
| 5,488,677 A * | 1/1996 | Tokano ........................... | 385/3 |
| 5,654,818 A * | 8/1997 | Yao ................................ | 359/246 |
| 6,038,354 A * | 3/2000 | Sato et al. ...................... | 385/2 |
| 6,192,167 B1 * | 2/2001 | Kissa et al. ..................... | 385/3 |
| 6,483,953 B1 * | 11/2002 | McBrien et al. ............... | 385/2 |
| 6,584,240 B2 * | 6/2003 | Doi et al. ....................... | 385/2 |
| 6,678,428 B2 * | 1/2004 | Seino et al. .................... | 385/2 |
| 6,781,741 B2 * | 8/2004 | Uesaka .......................... | 359/279 |
| 6,909,817 B2 * | 6/2005 | Bosso et al. ................... | 385/3 |
| 2003/0165001 A1 * | 9/2003 | Uesaka ......................... | 359/279 |

* cited by examiner

*Primary Examiner*—Ellen E. Kim
(74) *Attorney, Agent, or Firm*—Chapman and Cutler LLP (57) ABSTRACT

The present invention provides a cost-saving and space-saving optical modulator enabling application of modulation signals with high phase difference accuracy without using a separate component for generating a phase difference outside of the optical modulator, when identical modulation signals having a predetermined phase difference are applied into a plurality of modulation electrodes.

An optical modulator 20 including a substrate with an electro-optic effect, a plurality of optical waveguide sections 10 formed on the substrate, and a plurality of modulation electrodes 21 and 22 for modulating lights passing through the optical waveguide sections, and into which identical modulation signals having a predetermined phase difference are applied, wherein a branch element for branching a modulation signal into a plurality of modulation signals is formed, and a delay line for generating the phase difference is formed in the middle of lines for applying the modulation signals branched by the branch element into the plurality of modulation electrodes.

18 Claims, 7 Drawing Sheets

OPTICAL MODULATOR

BACKGROUND OF THE INVENTION (1) Field of the Invention

The present invention relates to an optical modulator, and in particular to an optical modulator applying identical modulation signals having a predetermined phase difference into a plurality of modulation electrodes.

(2) Related Art Statement

An optical modulation method for applying identical modulation signals having a predetermined phase difference (=time delay) into a plurality of modulation electrodes, such as an SSB (Single-Side band) modulation method, a duobinary modulation method or the like, has been conventionally utilized in the field of optical communications or optical measurement.

An SSB-type optical modulator consists of two sub Mach-Zehnder structures. In order to obtain SSB modulation signals, two splitted RF-signals with 90° phase difference by using an electrical 90° hybrid are applied to two sub-MZs modulation electrode respectively.

A dual-electrode Mach-Zehnder type optical modulator is used for the duobinary modulation method, whereby modulation signals respectively applied into the modulation electrodes of two branching waveguides are configured to have a predetermined bit difference therebetween by using a bit delay circuit. A bit delay is generally selected from the range from 0 to 2T (T=1 bit).

Because it is necessary to apply separate modulation signals respectively into the plurality of modulation electrodes in the SSB modulation method, the duobinary modulation method or the like as sated above, inputting a plurality of RF signals is required as the modulation signals for input. In addition, for the modulation methods giving a predetermined phase difference between each RF signal, an additional separate component, such as a delay circuit or the like, has been required to generate the phase difference. Therefore, there have been such problems as an increasing cost of the entire optical modulator, an increase of the setting space of delay circuit or the like. Furthermore, because phase difference accuracy of precisely 90° cannot be obtained by a commercially available 90° hybrid, it is necessary to separately use a phase adjuster for fine adjustment, and this makes the configuration more complicated.

Besides, in order to guide the plurality of modulation signals separately into the optical modulator, it is necessary to provide cables of different lengths between a signal source and interaction parts where the modulation signals act on lights in the optical waveguides, for generating a predetermined phase difference. Thus, the number of components is increased and the configuration gets complicated.

An object of the present invention is to solve the above described problems and provide a cost-saving and space-saving optical modulator enabling application of modulation signals with high phase difference accuracy without using the separate component for generating a phase difference outside of the optical modulator, when the identical modulation signals having a predetermined phase difference are applied into the plurality of modulation electrodes.

SUMMARY OF THE INVENTION

The invention of claim 1 provides an optical modulator including a substrate with an electro-optic effect, a plurality of optical waveguide sections formed on the substrate, and a plurality of modulation electrodes, for modulating lights passing through the optical waveguide sections, and into which identical modulation signals having a predetermined phase difference are applied, wherein a branch element for branching a modulation signal into a plurality of modulation signals is formed, and a delay line for generating the phase difference is formed in the middle of lines for applying the modulation signals, branched by the branch element into the plurality of modulation electrodes.

The invention of claim 2 provides the optical modulator according to claim 1, wherein the branch element is a divider or a T-type electrode.

The invention of claim 3 provides the optical modulator according to claim 2, wherein the divider or the T-type electrode is formed on a modulation signal relaying board positioned outside of the substrate.

The invention of claim 4 provides the optical modulator according to any one of claims 1 to 3, wherein the delay line is formed at least on the modulation signal relaying board positioned outside of the substrate, or on the substrate.

The invention of claim 5 provides the optical modulator according to any one of claims 1 to 4, wherein the optical modulator is an SSB-type optical modulator or a duobinary-type optical modulator.

In accordance with the invention of claim 1, the branch element for branching a modulation signal into a plurality of modulation signals is formed and the delay line for generating the phase difference is formed in the middle of lines for applying the modulation signals branched by the branch element into the plurality of modulation electrodes. Therefore, a conventional delay circuit becomes unnecessary, and it becomes possible to apply the modulation signals with high phase difference accuracy. Further, it becomes possible to provide a cost-saving and space-saving optical modulator.

In accordance with the invention of claim 2, because the branch element is a divider or a T-type electrode, it is possible to incorporate the divider or the T-type electrode onto the substrate of the optical modulator, or onto the modulation signal relaying board positioned outside of the substrate. Therefore, it becomes possible to make the optical modulator structurally compact. Further, when the T-type electrode is formed on the substrate, the branch element can be formed at the same time as the modulation electrodes, which simplifies the production process as well.

In accordance with the invention of claim 3, because the divider or the T-type electrode is formed on the modulation signal relaying board positioned outside of the substrate, it becomes possible to provide a cost-saving and space-saving optical modulator only by connecting the relaying board to a conventional type of optical modulator substrate. It is also possible to prepare a plurality of relaying boards and select an appropriate relaying board in accordance with the frequency or intensity of the modulation signal used.

In accordance with the invention of claim 4, the delay line is formed at least on the modulation signal relaying board positioned outside of the substrate, or on the substrate. When the relaying board is used, it becomes possible to prepare a plurality of relaying boards with different delay lines formed thereon, and change relaying boards in accordance with the necessary amount of delay (phase difference). When the delay line is formed on the substrate, the delay line can be formed at the same time as the modulation electrodes.

In accordance with the invention of claim 5, because the optical modulator is an SSB-type optical modulator or a duobinary-type optical modulator, a conventional delay circuit becomes unnecessary, and it becomes possible to apply the modulation signals with high phase difference accuracy, when the identical modulation signals having a predetermined phase difference are applied into the plurality of modulation electrodes, which is necessary for these optical modulators. Then, it becomes possible to provide a cost-saving and space-saving optical modulator.

EXPLANATION OF NUMERALS 1 microwave generator
2 amplifier
3 90° hybrid
4 semiconductor laser
6, 20, 30, 40, 50 SSB-type optical modulator
7 DC bias electrode
8 divider
10 SSB type optical waveguide
11, 12, 21, 22, 32, 33 modulation electrode
23, 35, 55 delay line
34, 52, 54 T-type electrode

DETAILED DESCRIPTION OF THE INVENTION

In the following, preferred embodiments of the present invention are explained in detail.

The present invention is characterized in including a substrate with an electro-optic effect, a plurality of optical waveguide sections formed on the substrate, and a plurality of modulation electrodes for modulating lights passing through the optical waveguide sections, and into which identical modulation signals having a predetermined phase difference are applied, wherein a branch element for branching a modulation signal into a plurality of modulation signals is formed, and a delay line for generating the phase difference is formed in the middle of lines for applying the modulation signals branched by the branch element into the plurality of modulation electrodes.

Embodiments of applying the present invention to an SSB-type optical modulator are explained.

Figure 1:
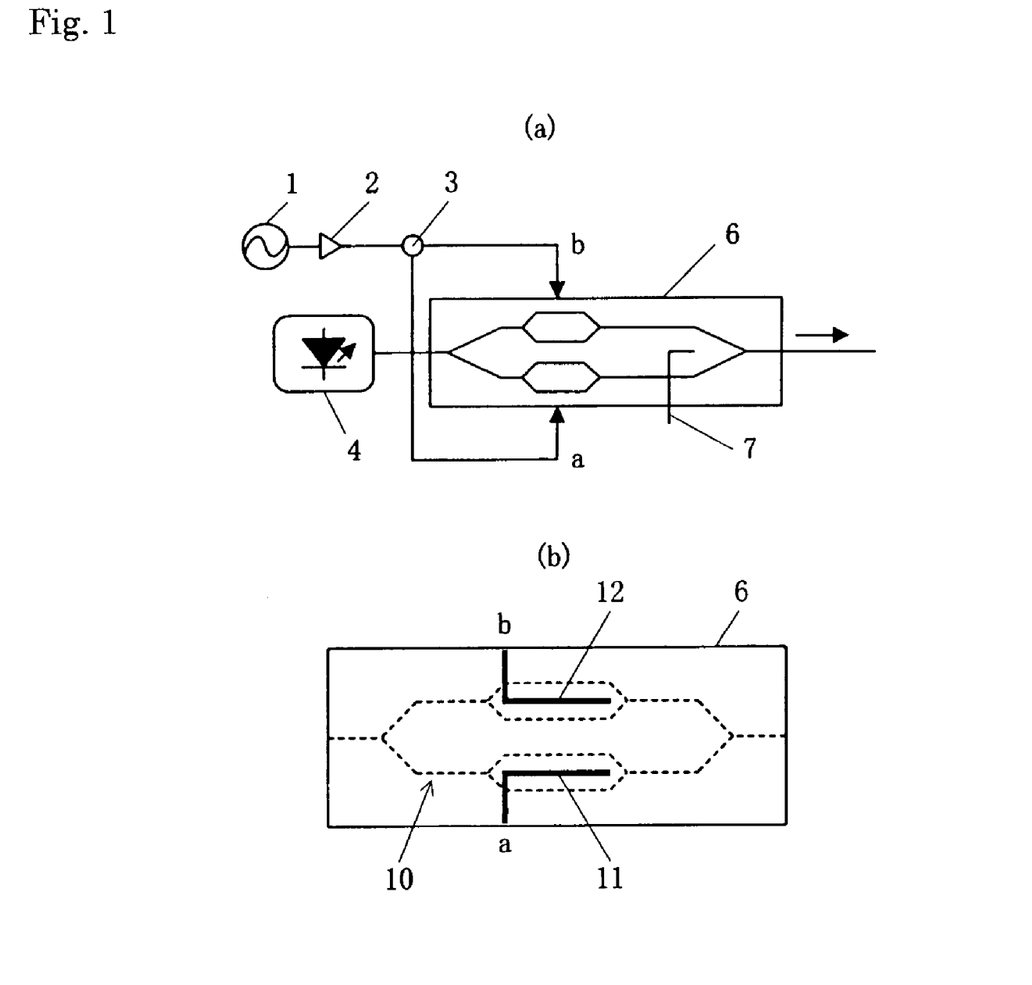
FIG. 1 are schematic diagrams for explaining conventional SSB-type optical modulator drive.

FIG. 1A illustrates conventional SSB-type optical modulator drive, Reference numeral 4 denotes a steady light source such as a semiconductor laser or the like. A laser beam from the light source 4 enters an SSB-type optical modulator 6, receives predetermined modulation, and exits as a modulated light from the other side from where it entered. FIG. 1B illustrates the structure of the SSB-type optical modulator of FIG. 1A. The dotted line indicates an optical waveguide 10, and the thick solid lines indicate modulation electrodes 11 and 12 in a simple manner.

The SSB-type optical modulator includes control electrodes, such as an optical waveguide, a modulation electrode, and a ground electrode, formed on a substrate with an electro-optic effect. The substrate with an electro-optic effect is made of lithium niobate, lithium tantalite, PLZT (lead lanthanum zirconate titanate) or quartz-based materials. The optical waveguide on the substrate can be formed by diffusing Ti or the like on the substrate surface by a thermal diffusion method or a proton exchange method. Further, the modulation electrode, or the ground electrode surrounding the modulation electrode can be formed by a method of formation of a Ti-Au electrode pattern, a gold plating method, or the like. A buffer layer such as dielectric $SiO_2$ and the like may be provided on the substrate surface after forming the optical waveguide, according to need.

The optical waveguide 10 of the SSB-type optical modulator 6 includes an SSB type optical waveguide where two sub MZ-type optical waveguides are incorporated into branching waveguides of a main MZ-type optical waveguide. The light propagating through each sub MZ-type optical waveguide receives modulation respectively by the modulation electrodes 11 and 12, and a DC bias electrode 7 for applying a DC bias is provided on the main MZ-type optical waveguide in order to adjust the phases of outgoing lights from the two sub MZ-type optical waveguides.

Modulation signals a and b to be applied into the SSB-type optical modulator can be obtained by amplifying by an amplifier 2 an output from a microwave generator 1 for generating a microwave, which is a modulation signal, and generating two modulation signals having the same wave patterns with a phase difference of 90°, by using a frequency divider of a 90° hybrid 3.

As described above, the frequency divider of 90° hybrid is used to generate a phase difference. However, there is a problem with the accuracy of the 90° hybrid, and a phase shift tends to occur due to a difference in the cable length from the hybrid to the SSB-type optical modulator after outputting. Therefore, it is necessary to adjust the cable length, a direct current bias voltage applied into the DC bias electrode 7, or the like, while actually operating the SSB-type optical modulator and checking a phase shift by an oscilloscope or the like.

On the other hand, the present invention uses a divider 8 for generating two in-phase signals, instead of the 90° hybrid, to input branched modulation signals a and b, which are kept in phase, into an SSB-type optical modulator 20 as shown in FIG. 2A. The phase difference of 90° required for SSB modulation is generated by adjusting the length of modulation electrodes 21 and 22 in the optical modulator 20 as shown in FIG. 2B. In particular, the modulation electrode 22, into which the modulation signal b is inputted, is longer in line length than the modulation electrode 21, into which the modulation signal a is input, for the length of a delay line 23 shown by the dotted line. The delay line length is set so as to generate a phase difference of 90° between the two inputted modulation signals a and b and reach the interaction part of each modulation electrode.

The phase difference of modulation signals is determined simply by the amount of delay generated by an operating frequency, a refractive index of microwave, and a line length. Therefore, a phase difference of 90° can be obtained by selecting an appropriate amount of delay by the operating frequency. For example, when the operating frequency is f=10 GHz, the refractive index of microwave is n=3.0 and the speed of light in a vacuum is $C=3 \times 10^8$[m/s], a delay line length L necessary for obtaining the phase difference of 90° is $L=C/(4 \times n \times f)=2.5 \times 10^3$[m].

In addition, in the present invention, because the modulation signals a and b can be supplied to the SSB-type optical modulator 20 from the same side of substrate, it is possible to simplify wiring of cables, by which a phase shift tends to be generated, and further, to simplify connection of cables to the SSB-type optical modulator.

Figure 3:
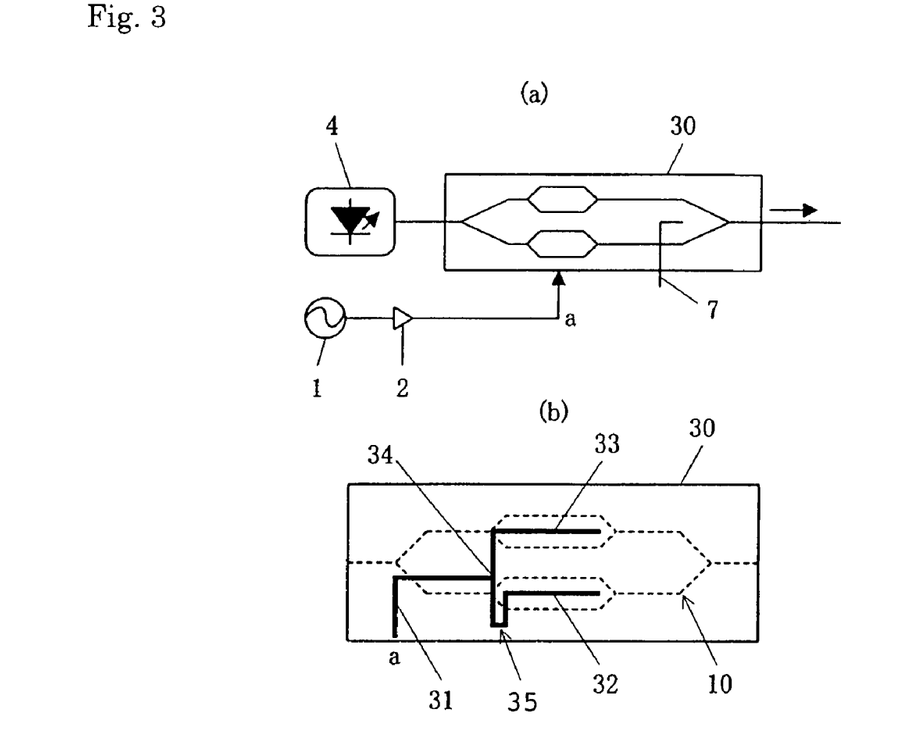
FIG. 3 are diagrams illustrating a second embodiment of the present invention.

A second embodiment of the present invention is shown in FIG. 3.

In FIGS. 3. a branch element such as a frequency divider is not provided outside of an SSB-type optical modulator 30. A T-type electrode 34, which is a branch element, and a delay line 35 are provided within the optical modulator 30, so as to apply identical modulation signals having a phase difference of 90° into modulation electrodes 32 and 33 as shown in FIG. 38. Reference numeral 31 denotes an introduction line of modulation signal into the T-type electrode 34.

As the configuration of the T-type electrode, it is preferable to match impedances of a junction as disclosed in Patent Document 1.

[Patent Document 1]

Japanese Patent Laid-open Publication No. 2004-163859

By forming the T-type electrode and the delay line in combination on the substrate of the optical modulator 30 as shown in FIG. 3, the external branch element becomes unnecessary, and only one modulation signal is required to be inputted into the optical modulator, Therefore, it is not at all necessary to consider the phase shift related to the connection of cables, and it becomes possible to simplify the configuration remarkably. Further, because the T-type electrode and delay line can be formed by using the production process of the modulation electrode of the optical modulator, the production process doesn't get complicated.

Figure 4:
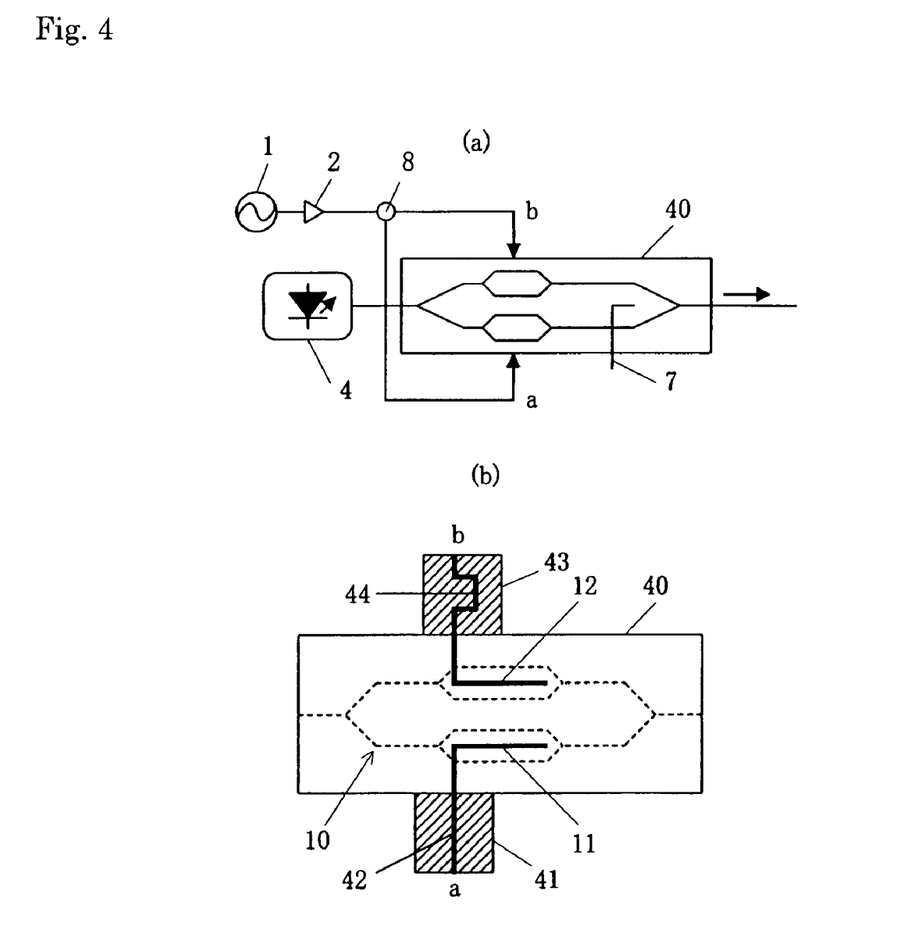
FIG. 4 are diagrams illustrating a third embodiment of the present invention.

Next, a third embodiment of the present invention is shown in FIG. 4.

Figure 2:
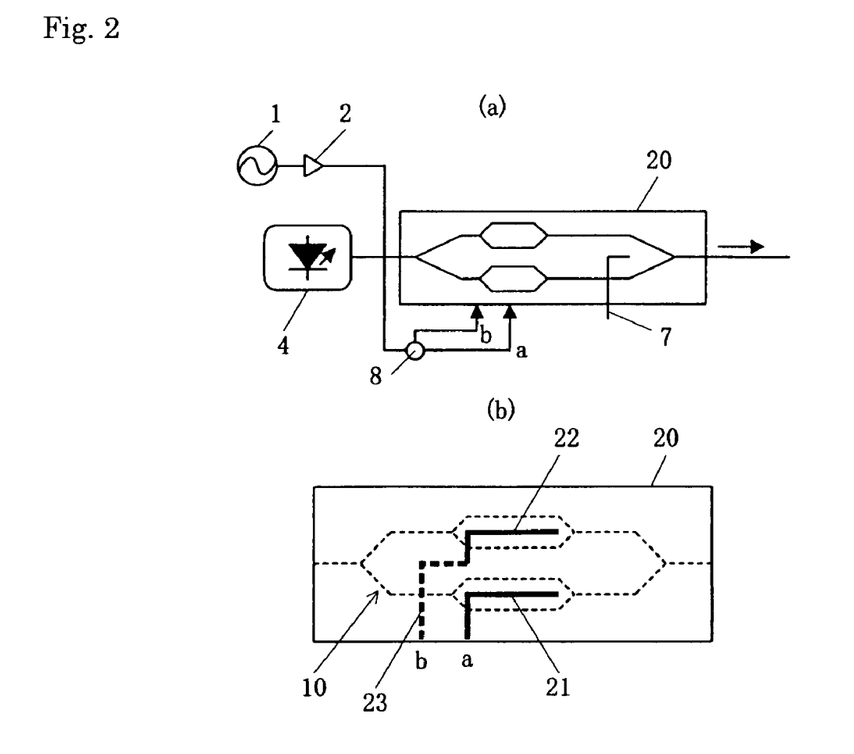
FIG. 2 are diagrams illustrating a first embodiment of the present invention.

In the third embodiment, delay lines like the one shown in FIG. 2 are formed on relaying boards 41 and 43 provided outside of the substrate of an SSB-type optical modulator 40. In particular, the lengths of delay lines 42 and 44 respectively formed on the relaying boards 41 and 43 are differentiated, whereby a predetermined phase difference is generated. The use of relaying boards as stated above enables the conventional type of optical modulator shown in FIG. 1 to be used as the SSB-type optical modulator 40.

A plurality of relaying boards with delay lines of different lengths may be prepared as the relaying board 41 or 43, and combined in accordance with the necessary phase difference. The SSB-type optical modulator 40, relaying boards 41 and 43 may be housed in one case to be a single module. In this case, SSB modulation can be achieved by guiding two in-phase modulation signals generated by the frequency divider 8 as in FIG. 2, respectively into input ports of the module.

Figure 5:
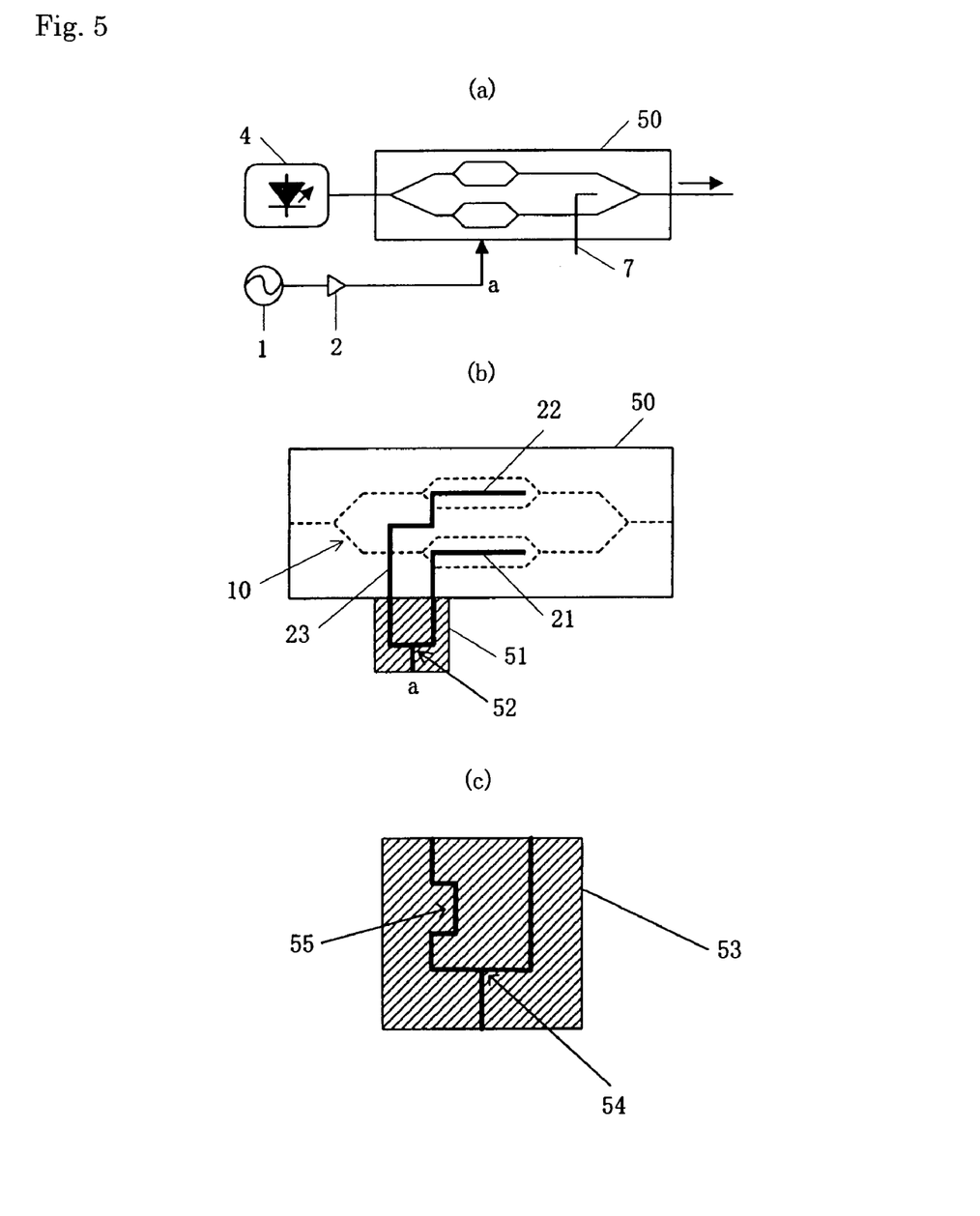
FIG. 5 are diagrams illustrating a fourth embodiment of the present invention.

A fourth embodiment of the present invention is shown in FIG. 5.

The fourth embodiment uses a relaying board 51 provided outside of the substrate of an SSB-type optical modulator 50 like the third embodiment. A T-type electrode 52 formed on the relaying board 51 allows omission of the frequency divider 8 of FIG. 4A. In the fourth embodiment, the delay line 23 is provided within the SSB-type optical modulator 50 like the first embodiment shown in FIG. 2. The use of such relaying board 51 enables only one modulation signal to be inputted.

By forming a delay line 55 like the delay line 44 in FIG. 4B as well as the T-type electrode 54 on a relaying board 53 as shown in FIG. 5C, the delay line 55 on the relaying board 53 may be endowed with the delay function of the delay circuit 23 partly or entirely.

Next, a method of adjusting the delay amount of the relaying board is explained.

Figure 6:
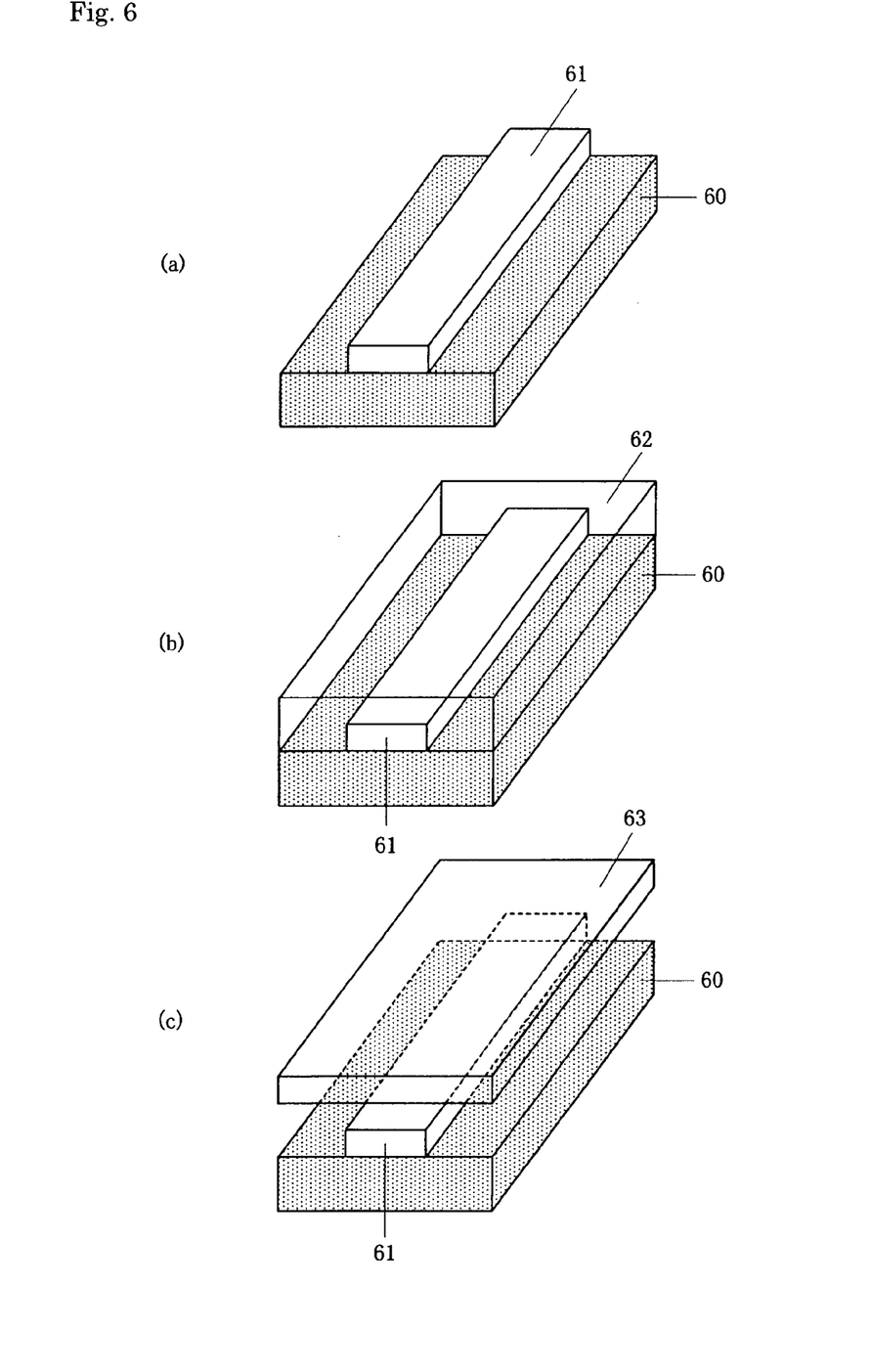
FIG. 6 are diagrams illustrating applications of relaying board according to the present invention.

When operating frequencies are different, it is necessary to change the delay amount in accordance with the frequency. It is possible to cope with a plurality of operating frequencies by providing a relaying board having a different delay amount in accordance with the frequency even when only one kind of optical modulator element is prepared, as described in the third embodiment. Various methods may be used to vary the amount of phase change of the relaying board as shown in FIG. 6.

A coaxial line, a microstrip line, and a CPW line are used as the line of the relaying board in order to allow propagation of an RF signal. FIG. 6 illustrate only a signal line 61 of microstrip line or CPW line. The signal line 61 for propagating the RF signal is formed on an insulating base 60 of the relaying board in FIG. 6A.

Delay may be generated by varying the refractive index of microwave as well as by changing the line length of the signal line 61 as described above. In particular, a method of using a material with a different dielectric constant as the insulating base 60, or a method of changing the line configuration, such as the shape of the signal line 61, the interval between the signal line 61 and a ground electrode that is not shown in the figure, or the like, may be used.

The effective refractive index of microwave may be changed by applying a high refractive index material 62, such as an adhesive, to the delay line of CPW line or microstrip line in order to re-adjust the phase of electrical signal as shown in FIG. 6B. Further, the operating frequency may be adjusted by positioning a plate-like body 63 of high refractive index material, metal or the like, close to the line, to increase the effective refractive index of microwave as shown in FIG. 6C.

In order to make the operating frequency variable, an element with a variable amount of phase change may be used for the relaying board. For example, a mechanical phase adjustor is used.

Although the SSB-type optical modulator is mainly explained hereinabove, the present invention may be applied to a duobinary modulation method as well. Patent Document 2 also discloses the duobinary modulation method.

Figure 7:
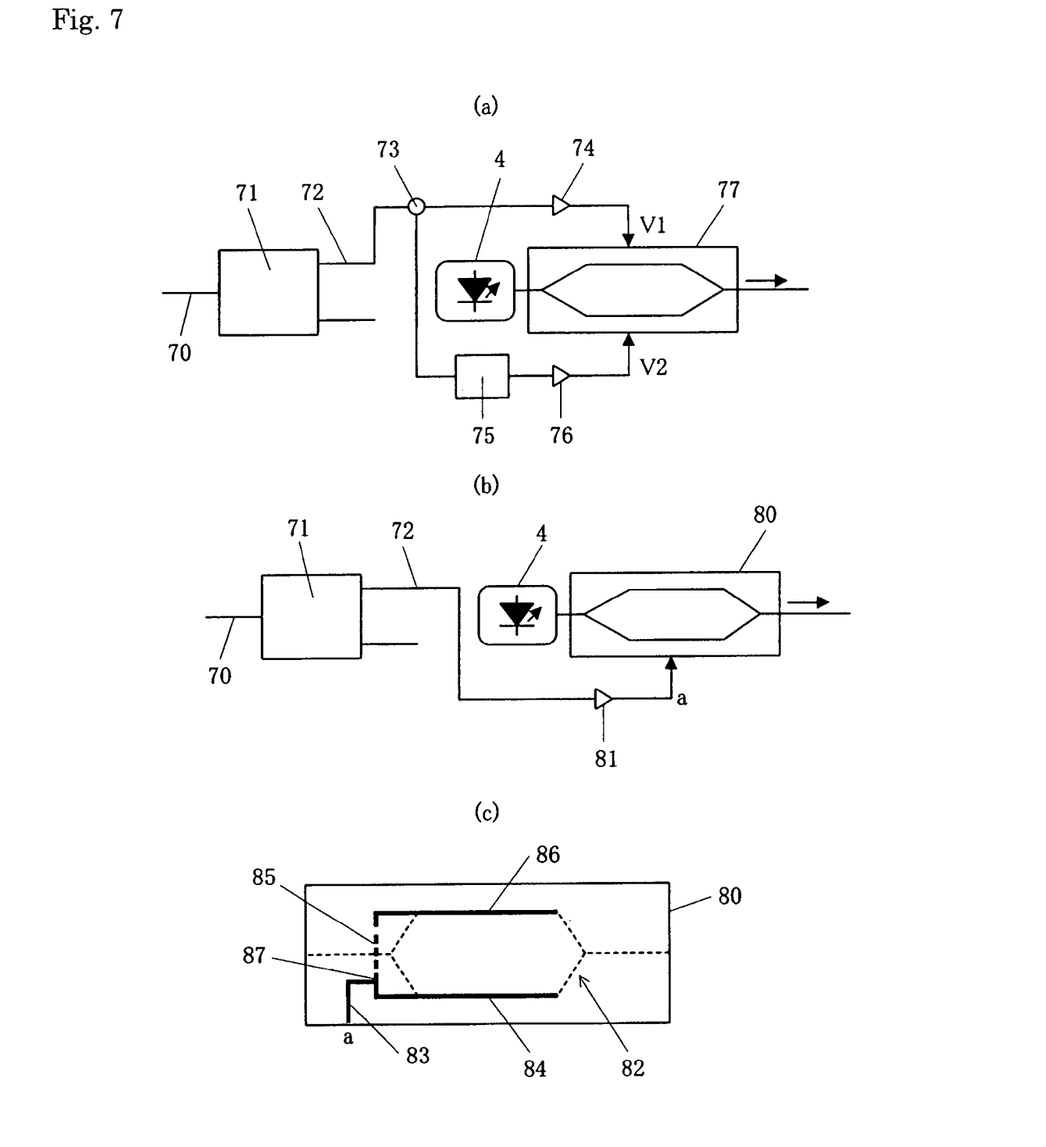
FIG. 7 are diagrams illustrating a fifth embodiment of the present invention.

FIG. 7A illustrates the drive of conventional duobinary modulation method. Signal data 70 are inputted into an encoder circuit 71, and one part 72 of the signal outputted from the encoder circuit is branched into two by a frequency divider 73. The branching signals, which are modulation signals, are amplified by amplifiers 74 and 76 to be signal voltages V1 and V2, which are respectively applied into the modulation electrodes corresponding to two branching waveguides of a dual-electrode MZ modulator 77. For at least one of the two branching signals, a bit delay circuit 75 is provided in the middle of the branching signal line, in order to generate a predetermined bit difference.

The fifth embodiment of the present invention is shown in FIGS. 7B and C.

A duobinary-type optical modulator 80 includes a MZ-type optical waveguide 82, modulation electrodes 84 and 86 respectively formed corresponding to the branching waveguides as shown in FIG. 7C. In addition, the lines connected to the modulation electrodes 84 and 86 include an introduction line section 83, a T-type electrode 87, and a delay line 85, Thus, the frequency divider or the bit delay circuit becomes unnecessary, and it becomes possible to simplify the configuration. The duobinary-type optical modulator 80 may be driven only by the amplifying signal 72 from the encoder circuit 71 by an amplifier 81 and applying it into one modulation signal input part a of the duobinary-type optical modulator 80 as shown in FIG. 7B.

As explained above, although the SSB-type optical modulator was used in the embodiments, the present invention is not limited to these embodiments, and can provide the cost-saving and space-saving optical modulator enabling application of modulation signals with high phase difference accuracy without using the separate component for generating a phase difference outside of the optical modulator.

What is claimed is:

1. An optical modulator comprising:
   a substrate with an electro-optic effect,
   an optical waveguide section formed on the substrate, and
   a modulation electrode for modulating light passing through the optical waveguide section, wherein
   the optical waveguide section is a double nested Mach-Zehnder type optical waveguide where two sub Mach-Zehnder type optical waveguides are incorporated into branch waveguides of a main Mach-Zehnder type optical waveguide,
   the modulation electrode comprises a plurality of modulation electrodes for modulating lights passing through the two sub Mach-Zehnder type optical waveguides,
   a branch element for branching a modulation signal into a plurality of modulation signals having identical waveforms is formed,
   a delay line for generating a specific phase difference between the plurality of modulation signals is interposed between a plurality of signal lines for applying the plurality of modulation signals branched by the branch element into the plurality of modulation electrodes, and
   the plurality of modulation signals having the identical waveforms and the specific phase difference are applied into the lights passing through the two sub Mach-Zehnder type optical waveguides.

2. The optical modulator according to claim 1, wherein the branch element is formed on a modulation signal relaying board positioned outside of the substrate.

3. The optical modulator according to claim 2, wherein the delay line is formed at least on the modulation signal relaying board positioned outside of the substrate, or on the substrate.

4. The optical modulator according to claim 2, wherein the optical modulator is an SSB-type optical modulator or a duobinary-type optical modulator.

5. The optical modulator according to claim 2, wherein the specific phase difference is 90° or a specific bit difference within a range from 0 to 2T (T=1 bit).

6. The optical modulator according to claim 1, wherein the delay line is formed at least on the modulation signal relaying board positioned outside of the substrate, or on the substrate.

7. The optical modulator according to claim 6, wherein the optical modulator is an SSB-type optical modulator or a duobinary-type optical modulator.

8. The optical modulator according to claim 6, wherein the specific phase difference is 90° or a specific bit difference within a range from 0 to 2T (T=1 bit).

9. The optical modulator according to claim 1, wherein the optical modulator is an SSB-type optical modulator or a duobinary-type optical modulator.

10. The optical modulator according to claim 9, wherein the specific phase difference is 90° or a specific bit difference within a range from 0 to 2T (T=1 bit).

11. The optical modulator according to claim 1, wherein the specific phase difference is 90° or a specific bit difference within a range from 0 to 2T (T=1 bit).

12. The optical modulator according to claim 1, wherein due branch element and the delay line are formed on the substrate.

13. The optical modulator according to claim 12, wherein the optical modulator is an SSB-type optical modulator or a duobinary-type optical modulator.

14. The optical modulator according to claim 12, wherein the specific phase difference is 90° or a specific bit difference within a range from 0 to 2T (T=1 bit).

15. An optical modulator comprising:
    a substrate with an electro-optic effect,
    an optical waveguide section formed on the substrate, and
    a modulation electrode for modulating light passing through the optical waveguide section, wherein
    the optical waveguide section is a Mach-Zehnder type optical waveguide,
    the modulation electrode comprises a plurality of modulation electrodes for modulating lights passing through two branch waveguides of the Mach-Zehnder type optical waveguide,
    a branch element for branching a modulation signal into a plurality of modulation signals having identical waveforms is formed,
    a delay line for generating a specific phase difference between the plurality of modulation signals is interposed between a plurality of signal lines for applying the plurality of modulation signals branched by the branch element into the plurality of modulation electrodes,
    the plurality of modulation signals having the identical waveforms and the specific phase difference are applied into the lights passing through the two branch waveguides, and
    the delay line is formed at least on a modulation signal relaying board positioned outside of the substrate, or on the substrate.

16. The optical modulator according to claim 15, wherein the optical modulator is a duobinary-type optical modulator, and the specific phase difference is a specific bit difference within a range from 0 to 2T (T=1 bit).

17. An optical modulator comprising:
    a substrate with an electro-optic effect,
    an optical waveguide section formed on the substrate, and
    a modulation electrode for modulating light passing through the optical waveguide section, wherein
    the optical waveguide section is a Mach-Zehnder type optical waveguide,
    the modulation electrode comprises a plurality of modulation electrodes for modulating lights passing through two branch waveguides of the Mach-Zehader type optical waveguide,
    a branch element for branching a modulation signal into a plurality of modulation signals having identical waveforms is formed,
    a delay line for generating a specific phase difference between the plurality of modulation signals is interposed between a plurality of signal lines for applying the plurality of modulation signals branched by the branch element into the plurality of modulation electrodes, the plurality of modulation signals having the identical waveforms and the specific phase difference are applied into the lights passing through the two branch waveguides, and the branch element and the delay line are formed on the substrate.

18. The optical modulator according to claim 17, wherein the optical modulator is a duobinary-type optical modulator, and the specific phase difference is a specific bit difference within a range from 0 to 2T (T=1 bit).

* * * * *